United States Patent
Naik et al.

(10) Patent No.: US 12,039,790 B2
(45) Date of Patent: Jul. 16, 2024

(54) METHOD AND SYSTEM FOR SEATBELT DETECTION USING DETERMINATION OF SHADOWS

(71) Applicant: MAGNA ELECTRONICS, LLC, Southfield, MI (US)

(72) Inventors: Afrah Naik, Southfield, MI (US); Caroline Chung, Southfield, MI (US); Mitchell Pleune, Southfield, MI (US)

(73) Assignee: MAGNA ELECTRONICS, LLC, Southfield, MI (US)

( * ) Notice: Subject to any disclaimer, the term of this patent is extended or adjusted under 35 U.S.C. 154(b) by 0 days.

(21) Appl. No.: 17/556,308

(22) Filed: Dec. 20, 2021

(65) Prior Publication Data

US 2023/0196796 A1    Jun. 22, 2023

(51) Int. Cl.
    *G06V 20/59*    (2022.01)
    *G06T 7/70*     (2017.01)
    *G06V 10/25*    (2022.01)
    *G06V 40/10*    (2022.01)
    *H04N 23/56*    (2023.01)
    *H04N 23/80*    (2023.01)

(52) U.S. Cl.
    CPC .............. *G06V 20/59* (2022.01); *G06T 7/70* (2017.01); *G06V 10/25* (2022.01); *G06V 40/103* (2022.01); *H04N 23/56* (2023.01); *H04N 23/80* (2023.01); *G06T 2207/10048* (2013.01); *G06T 2207/30196* (2013.01); *G06T 2207/30268* (2013.01)

(58) Field of Classification Search
    None
    See application file for complete search history.

(56) References Cited

U.S. PATENT DOCUMENTS

| | | | |
|---|---|---|---|
| 9,881,349 B1 | 1/2018 | Meier et al. | |
| 10,864,826 B2 | 12/2020 | Kuepper et al. | |
| 2007/0195990 A1 | 8/2007 | Levy | |
| 2007/0282506 A1* | 12/2007 | Breed | G06V 20/593 |
| | | | 701/45 |
| 2012/0213440 A1* | 8/2012 | Tappen | G06T 7/11 |
| | | | 382/173 |

(Continued)

FOREIGN PATENT DOCUMENTS

| | | | | |
|---|---|---|---|---|
| DE | 102018122481 A1 * | 3/2020 | | |
| WO | WO-2020139355 A1 * | 7/2020 | | G01C 21/3602 |

*Primary Examiner* — James M Anderson, II
(74) *Attorney, Agent, or Firm* — DICKINSON WRIGHT PLLC

(57) ABSTRACT

A method for detecting a position of a seatbelt in a vehicle includes: capturing, by a camera, a source image of an occupant in the vehicle; determining a pose of the occupant based on the source image; determining an occupant shadow based on the pose of the occupant; determining, based on the occupant shadow, a shadow overlying a region of interest (ROI) in the source image; and detecting, based on the shadow overlying the ROI, the seatbelt within the ROI. A system for detecting a position of a seatbelt is also provided. The system includes a camera and controller in communication with the camera and configured to: determine a pose of the occupant; determine an occupant shadow based on the pose of the occupant; determine, based on the occupant shadow, a shadow overlying the ROI; and detect, based on the shadow overlying the ROI, the seatbelt within the ROI.

20 Claims, 8 Drawing Sheets

(56) References Cited

U.S. PATENT DOCUMENTS

| | | | |
|---|---|---|---|
| 2018/0211123 A1 | 7/2018 | Yasuda et al. | |
| 2018/0326944 A1* | 11/2018 | Cech | G06V 20/593 |
| 2019/0225186 A1* | 7/2019 | Szawarski | G06V 20/597 |
| 2019/0286932 A1* | 9/2019 | Du | G06F 18/2413 |
| 2020/0055480 A1* | 2/2020 | Herbert | G06V 20/59 |
| 2021/0117677 A1* | 4/2021 | Loveland | G06T 19/00 |
| 2021/0206344 A1* | 7/2021 | George | B60R 21/01534 |

* cited by examiner

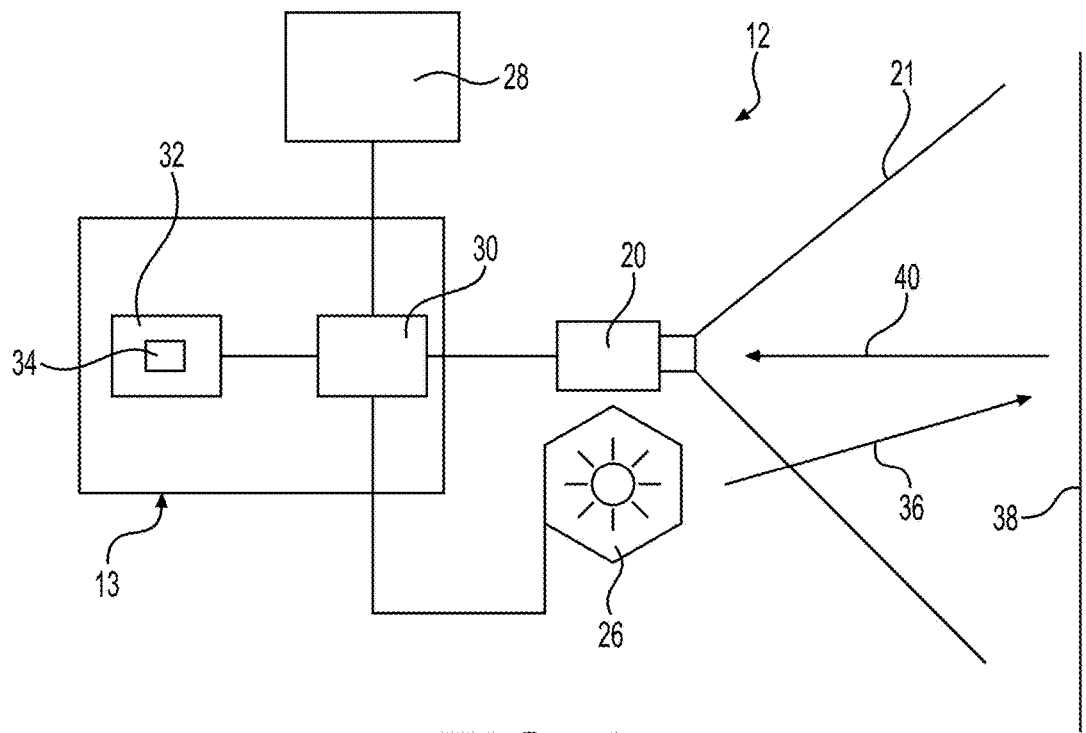
FIG. 3
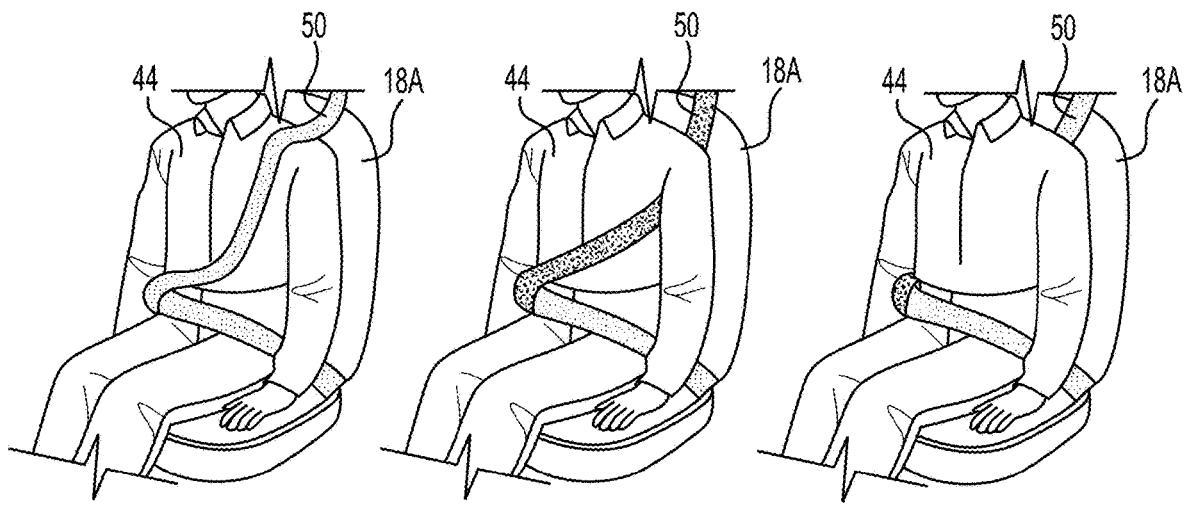
FIG. 4  FIG. 5  FIG. 6

METHOD AND SYSTEM FOR SEATBELT DETECTION USING DETERMINATION OF SHADOWS

BACKGROUND

1. Field of the Invention

The present invention generally relates systems and methods for detecting a seatbelt using a vision system. More specifically, the present invention relates to systems and methods that determine a shadow in a vehicle and use the shadow detection to improve vision-based detection of the seatbelt.

2. Description of Related Art

Cameras and other image detection devices have been utilized to detect one or more objects. Control systems that are in communication with these cameras can receive images captured by the cameras and process these images. The processing of these images can include detecting one or more objects found in the captured images. Based on these detected objects, the control system may perform some type of action in response to these detected variables.

Conventional systems for detecting seatbelt usage typically rely upon a seat belt buckle switch. However, those conventional systems are unable to detect if the seatbelt is properly positioned or if the seat belt buckle is being spoofed. Seat track sensors are typically used to determine distance to an occupant of a motor vehicle. However, such use of seat track sensors do not account for body position of the occupant relative to the seat.

Shadows, such as shadows caused by an occupant and/or an object in the vehicle, may adversely affect the ability of vision-based methods and systems to detect a seatbelt.

SUMMARY

A method for detecting a position of a seatbelt in a vehicle is provided. The method comprises: capturing, by a camera, a source image of an occupant in the vehicle; determining a pose of the occupant based on the source image; determining an occupant shadow based on the pose of the occupant; determining, based on the occupant shadow, a shadow overlying a region of interest in the source image; and detecting, based on the shadow overlying the region of interest, the seatbelt within the region of interest.

A system for detecting a position of a seatbelt in a vehicle is also provided. The system comprises: a camera configured to capture a source image of an occupant in the vehicle; and a controller in communication with the camera. The controller is configured to: determine a pose of the occupant based on the source image; determine an occupant shadow based on the pose of the occupant; determine, based on the occupant shadow, a shadow overlying a region of interest in the source image; detect, based on the shadow overlying the region of interest, the seatbelt within the region of interest.

Further objects, features, and advantages of this invention will become readily apparent to persons skilled in the art after a review of the following description, with reference to the drawings and claims that are appended to and form a part of this specification.

BRIEF DESCRIPTION OF THE DRAWINGS

FIG. 3 illustrates a block diagram of the system for detecting proper seatbelt usage and for detecting distance to the seatbelt;

FIG. 4 illustrates a first example of improper seatbelt positioning;

FIG. 5 illustrates a second example of improper seatbelt positioning;

FIG. 6 illustrates a third example of improper seatbelt positioning;

DETAILED DESCRIPTION

Figure 1:
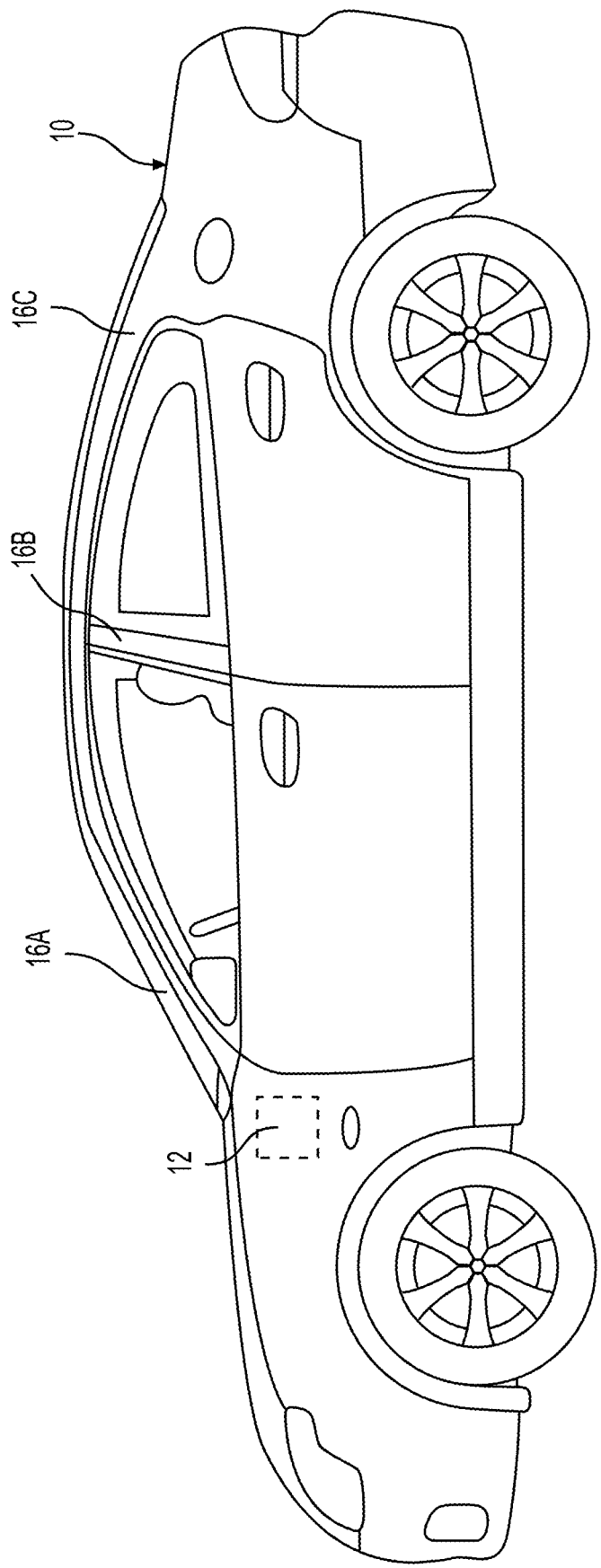
FIG. 1 illustrates a vehicle having a system for detecting proper seatbelt usage and for detecting distance to the seatbelt.

Referring to FIG. 1, illustrated is a vehicle 10 having a seatbelt detection system 12 for detecting proper seatbelt usage and/or for detecting distance to the seatbelt. In this example, the seatbelt detection system 12 has been incorporated within the vehicle 10. However, it should be understood that the seatbelt detection system 12 could be a standalone system separate from the vehicle 10. In some embodiments, the seatbelt detection system 12 may employ some or all components existing in the vehicle 10 for other systems and/or for other purposes, such as for driver monitoring in an advanced driver assistance system (ADAS). Thus, the seatbelt detection system 12 of the present disclosure may be implemented with very low additional costs.

As to the vehicle 10, the vehicle 10 is shown in FIG. 1 as a sedan type automobile. However, it should be understood that the vehicle 10 may be any type of vehicle capable of transporting persons or goods from one location to another. As such, the vehicle 10 could, in addition to being a sedan type automobile, could be a light truck, heavy-duty truck, tractor-trailer, tractor, mining vehicle, and the like. Also, it should be understood that the vehicle 10 is not limited to wheeled vehicles but could also include non-wheeled vehicles, such as aircraft and watercraft. Again, the term vehicle should be broadly understood to include any type of vehicle capable of transporting persons or goods from one location to another and it should not be limited to the specifically enumerated examples above.

Figure 2:
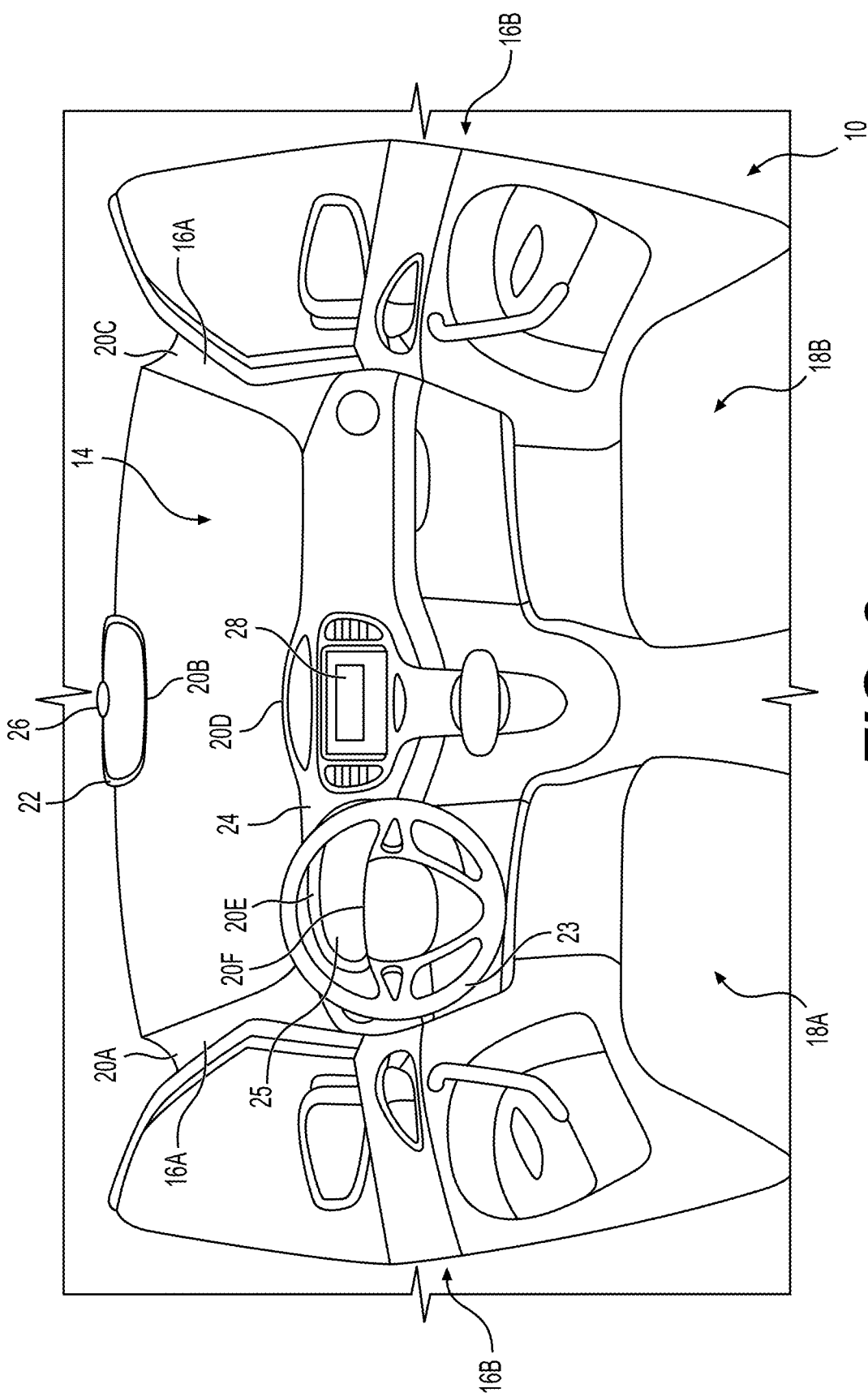
FIG. 2 illustrates a forward looking view of a cabin of the vehicle having a system for detecting proper seatbelt usage and for detecting distance to the seatbelt.

Referring to FIG. 2, a cabin 14 of the vehicle 10 is shown. As it is well understood in the art, the cabin 14 is essentially the interior of the vehicle 10 wherein occupants and/or goods are located when the vehicle is in motion. The cabin 14 of the vehicle may be defined by one or more pillars that structurally define the cabin 14. For example, in FIG. 2, A-pillars 16A and B-pillars 16B are shown. FIG. 1 further illustrates that there may be a third pillar or a C-pillar 16C. Of course, it should be understood that the vehicle 10 may contain any one of a number of pillars so as to define the cabin 14. Additionally, it should be understood that the vehicle 10 may be engineered so as to remove these pillars, essentially creating an open-air cabin 14 such as commonly found in automobiles with convertible tops.

Located within the cabin 14 are seats 18A and 18B. The seats 18A and 18B are such that they are configured so as to support an occupant of the vehicle 10. The vehicle 10 may have any number of seats. Furthermore, it should be understood that the vehicle 10 may not have any seats at all.

The vehicle 10 may have one or more cameras 20A-20F located and mounted to the vehicle 10 so as to be able to have a field a view of at least a portion of the cabin 14 that function as part of a vision system. As such, the cameras 20A-20F may have a field of view of the occupants seated in the seats 18A and/or 18B. Here, cameras 20A and 20C are located on the A-pillars 16A. Camera 20B is located on a rearview mirror 22. Camera 20D may be located on a dashboard 24 of the vehicle 10. Camera 20E and 20F may focus on the driver and/or occupant and may be located adjacent to the vehicle cluster 25 or a steering wheel 23, respectively. Of course, it should be understood that any one of a number of different cameras may be utilized. As such, it should be understood that only one camera may be utilized or numerous cameras may be utilized. Furthermore, the cameras 20A-20F may be located and mounted to the vehicle 10 anywhere so long as to have a view of at least a portion of the cabin 14.

The cameras 20A-20F may be any type of camera capable of capturing visual information. This visual information may be information within the visible spectrum, but could also be information outside of the visible spectrum, such as infrared or ultraviolet light. Here, the cameras 20A-20F are near infrared (NIR) cameras capable of capturing images generated by the reflection of near infrared light. Near infrared light may include any light in the near-infrared region of the electromagnetic spectrum (from 780 nm to 2500 nm). However, the seatbelt detection system 12 of the present disclosure may be configured to use a specific wavelength or range of wavelengths within the near-infrared region.

The source of this near-infrared light could be a natural source, such as the sun, but could also be an artificial source such as a near-infrared light source 26. The near-infrared light source 26 may be mounted anywhere within the cabin 14 of the vehicle 10 so as long as to be able to project near-infrared light into at least a portion of the cabin 14. Here, the near-infrared light source 26 is mounted to the rearview mirror 22 but should be understood that the near-infrared light source 26 may be mounted anywhere within the cabin 14. Additionally, it should be understood that while only one near-infrared light source 26 is shown, there may be more than one near-infrared light source 26 located within the cabin 14 of the vehicle 10.

Also located within the cabin 14 may be an output device 28 for relaying information to one or more occupants located within the cabin 14. Here, the output device 28 is shown in a display device so as to convey visual information to one or more occupants located within the cabin 14. However, it should be understood that the output device 28 could be any output device capable of providing information to one or more occupants located within the cabin 14. As such, for example, the output device may be an audio output device that provides audio information to one or more occupants located within the cabin 14 of a vehicle 10. Additionally, should be understood that the output device 28 could be a vehicle subsystem that controls the functionality of the vehicle.

Referring to FIG. 3, a more detailed illustration of the seatbelt detection system 12 is shown. Here, the system 12 includes a control system 13 having a processor 30 in communication with a memory 32 that contains instructions 34 for executing any one of a number of different methods disclosed in this specification. The processor 30 may include a single stand-alone processor or it may include two or more processors, which may be distributed across multiple systems working together. The memory 32 may be any type of memory capable of storing digital information. For example, the memory may be solid-state memory, magnetic memory, optical memory, and the like. Additionally, it should be understood that the memory 32 may be incorporated within the processor 30 or may be separate from the processor 30 as shown.

The processor 30 may also be in communication with a camera 20. The camera 20 may be the same as cameras 20A-20F shown and described in FIG. 2. The camera 20, like the cameras 20A-20F in FIG. 2, may be a near-infrared camera. The camera 20 may include multiple physical devices, such as cameras 20A-20F illustrated in FIG. 2. The camera 20 has a field of view 21.

The near-infrared light source 26 may also be in communication with the processor 30. When activated by the processor 30, the near-infrared light source 26 projects near-infrared light 36 to an object 38 which may either absorb or reflect near-infrared light 40 towards the camera 20 wherein the camera can capture images illustrating the absorbed or reflected near-infrared light 40. These images may then be provided to the processor 30.

The processor 30 may also be in communication with the output device 28. The output device 28 may include a visual and/or audible output device capable of providing information to one or more occupants located within the cabin 14 of FIG. 2. Additionally, it should be understood that the output device 28 could be a vehicle system, such as a safety system that may take certain actions based on input received from the processor 30. For example, the processor 30 may instruct the output device 28 to limit or minimize the functions of the vehicle 10 of FIG. 1. As will be explained later in this specification, one of the functions that the seatbelt detection system 12 may perform is detecting if an occupant is properly wearing a safety belt. If the safety belt is not properly worn, the processor 30 could instruct the output device 28 to limit the functionality of the vehicle 10, such that the vehicle 10 can only travel at a greatly reduced speed.

FIG. 4 illustrates a first example of improper seatbelt positioning, showing a seatbelt 50 that is ill-adjusted on an occupant 44 sitting on a seat 18A of the vehicle 10. The ill-adjusted seatbelt 50 in this example, drapes loosely over the shoulder of the occupant 44. FIG. 5 illustrates a second example of improper seatbelt positioning, showing the seatbelt 50 passing under the armpit of the occupant 44. FIG. 6 illustrates a third example of improper seatbelt positioning, showing the seatbelt 50 passing behind the back of the occupant 44. The seatbelt detection system may detect other examples of improper seatbelt positioning, such as a seatbelt that is missing or which is not worn by the occupant 44, even in cases where the buckle is spoofed (e.g. by plugging-in the buckle with the seatbelt behind the occupant 44 or by placing a foreign object into the buckle latch).

Figure 7A:
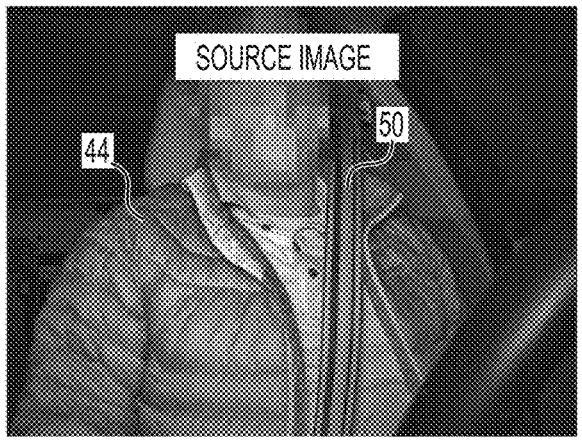
FIG. 7A shows a near infrared (NIR) image of a person wearing a seatbelt in accordance with an aspect of the present disclosure.
Figure 7B:
FIG. 7B shows a filtered image based on the NIR image of FIG. 7A, in accordance with the present disclosure.
Figure 7C:
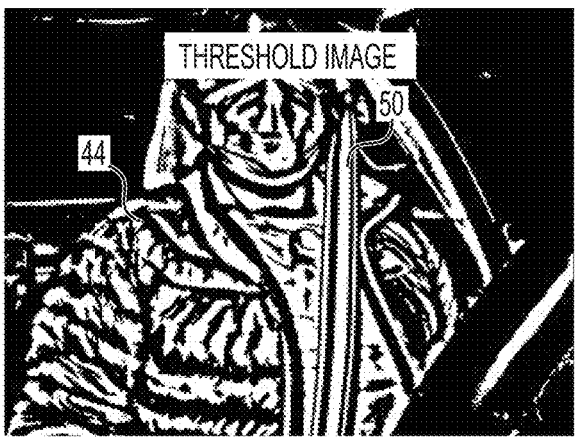
FIG. 7C shows a Black/White image based on the NIR image of FIG. 7A, in accordance with the present disclosure.
Figure 7D:
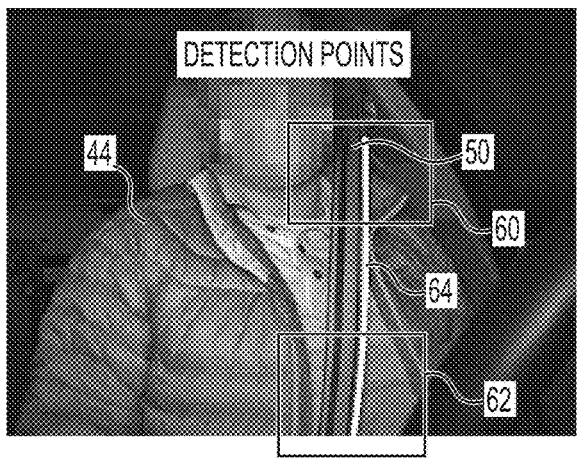
FIG. 7D shows an image based on the NIR image of FIG. 7A, illustrating detection points, in accordance with the present disclosure.

FIG. 7A shows a near infrared (NIR) image of an occupant 44 wearing a seatbelt 50 in accordance with an aspect of the present disclosure. This may represent an image captured by the camera 20 and received by the processor 30. In some embodiments, the occupant 44 may be a driver of the vehicle 10. However, the occupant 44 could also be a passenger in the vehicle 10. FIG. 7B shows a filtered image based on the NIR image of FIG. 7A; FIG. 7C shows a Black/White image based on the NIR image of FIG. 7A; and FIG. 7D shows an image based on the NIR image of FIG. 7A, illustrating detection points, in accordance with the present disclosure. Specifically, FIG. 7D shows the seatbelt 50 passing through each of a first region of interest (ROI) 60 and a second ROI 62. The first ROI 60 may be located above a shoulder of the occupant 44, and the second ROI 62 may be located below and to the left of the first ROI. The second ROI 62 may correspond to a central region of the occupant's 44 torso. The ROIs 60, 62 may each have a fixed location within the field of view 21 of the camera 20. Alternatively, the system 12 may adjust the positions of one or both of the ROIs 60, 62 based on a detected location of the occupant 44 within the field of view 21 of the camera 20.

Figure 8:
FIG. 8 shows an image of an occupant wearing a seatbelt, and with a boundary of a shadow in the image.

FIG. 8 shows an image of an occupant 44 wearing a seatbelt 50, and with a boundary 70 of a shadow in the image. The boundary 70 of the shadow crosses the face of the occupant 44 and the seatbelt 50. The shadow may be caused by light obstructed by one or more of a body part of the occupant 44, and/or an item in the vehicle, such as a steering wheel or a visor. Alternatively or additionally, the shadow may include an external shadow due to an external illumination source outside of the vehicle. Such an external shadow may be defined by one or more objects inside of and/or outside of the vehicle.

Figure 9:
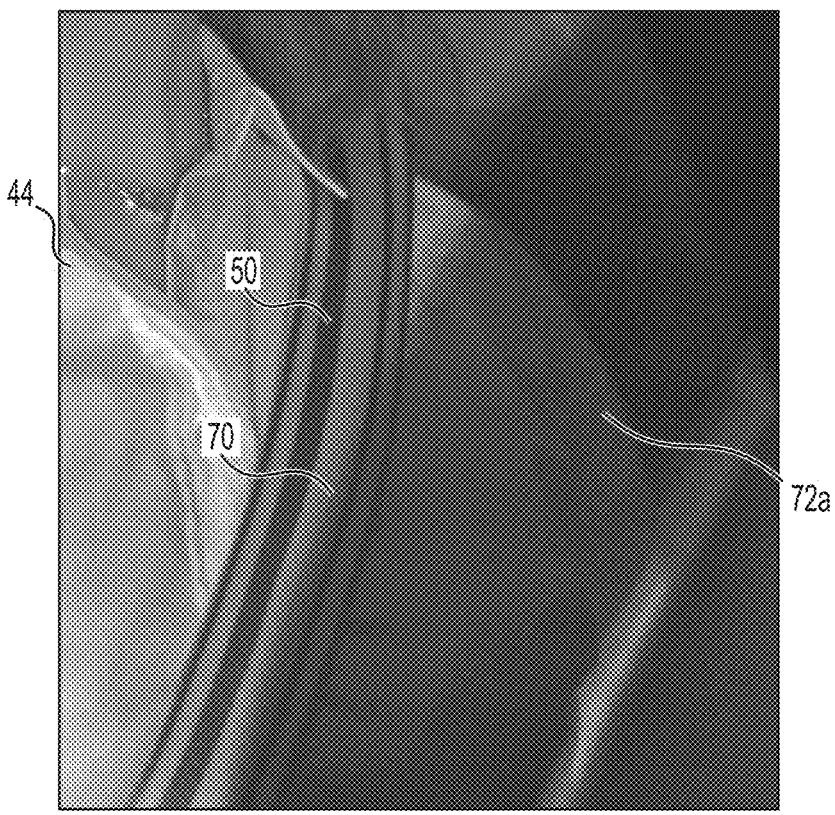
FIG. 9 shows an image of an occupant wearing a seatbelt, and with a boundary of a shadow overlying the seatbelt.

FIG. 9 shows an image of an occupant 44 wearing a seatbelt 50, and with a boundary 70 of a band-shaped shadow 72a having a boundary that overlies the seatbelt 50. The band-shaped shadow 72a may result from an item in the vehicle, such as a steering wheel, blocking light from an internal source in the vehicle, such as the near-infrared light source 26.

Figure 10:
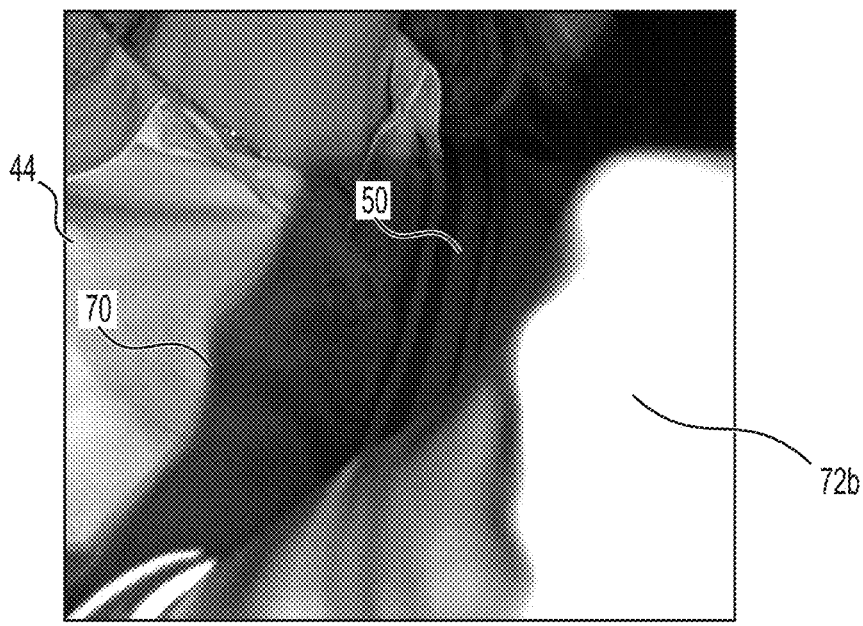
FIG. 10 shows an image of an occupant wearing a seatbelt, and with a shadow of a hand of the occupant.

FIG. 10 shows an image of an occupant 44 wearing a seatbelt 50, and with a shadow of a hand 72 of the occupant 44. The shadow defines a boundary 70 and results from the hand 72 blocking light from an internal source in the vehicle, such as the near-infrared light source 26. Additionally or alternatively, other body parts of the occupant 44, such as a head or a forearm, may cause the shadow.

Figure 11A:
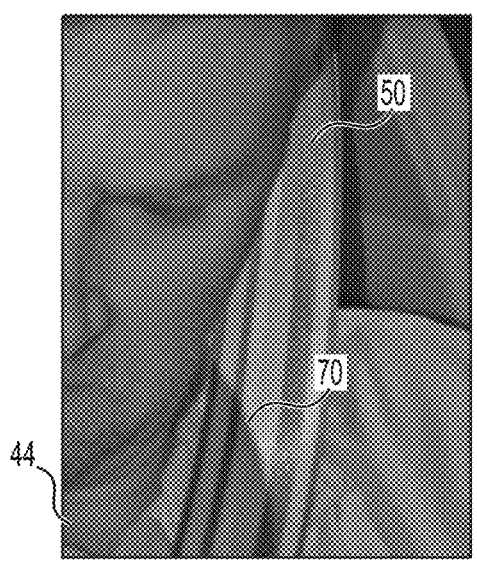
FIG. 11A shows an image of an occupant wearing a seatbelt, with a shadow of a head of the occupant, and with a boundary of a shadow overlying the seatbelt.
Figure 11B:
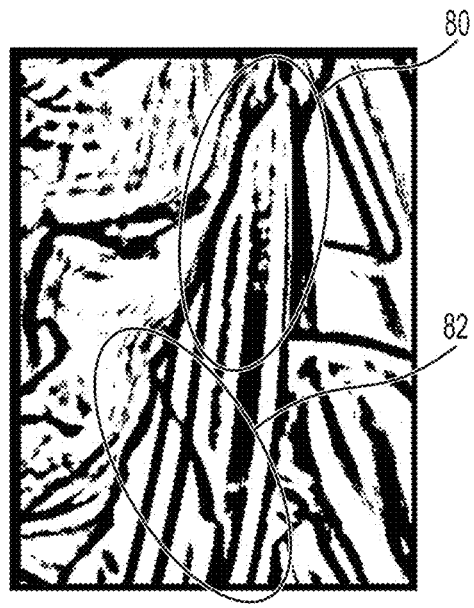
FIG. 11B shows a black-and-white image based on the image of FIG. 11A.

FIG. 11A shows an image of an occupant 44 wearing a seatbelt 50, with a shadow of a head of the occupant, and with a boundary 70 of a shadow overlying the seatbelt 50. FIG. 11B shows a black-and-white image based on the image of FIG. 11A. Such a black-and-white image may be used for vision-based seatbelt detection. The black-and-white image may be used for thresholding or edge detection. Both these techniques rely on contrast changes in nearby pixels. These contrast changes may be difficult to detect in presence of in-vehicle shadows, such as shadows caused by the driver's head and body, along with the in-vehicle structural objects such as steering vehicle, visors etc. FIG. 11B includes a first area 80 showing a first type of interference in which a striped pattern of the seatbelt 50 is interrupted or otherwise obscured in the black-and-white image due to a shadow. FIG. 11B also includes a second area 82 showing an additional dark stripe on the black- and white image caused by the boundary 70 of the shadow.

Figure 12A:
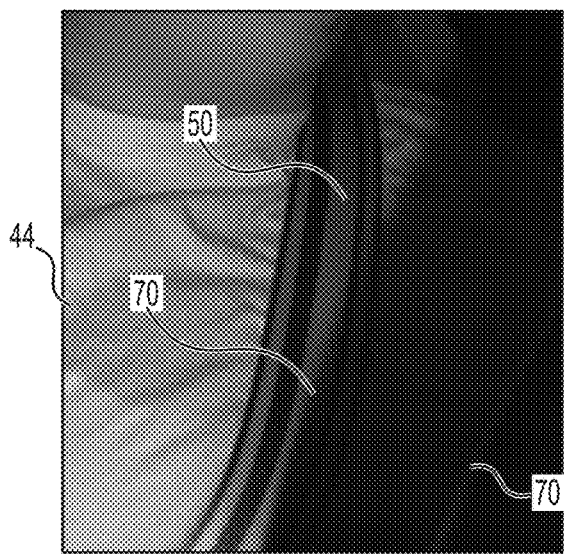
FIG. 12A shows an image of an occupant wearing a seatbelt, with a shadow caused by an item in the vehicle, and with a boundary of a shadow overlying the seatbelt.
Figure 12B:
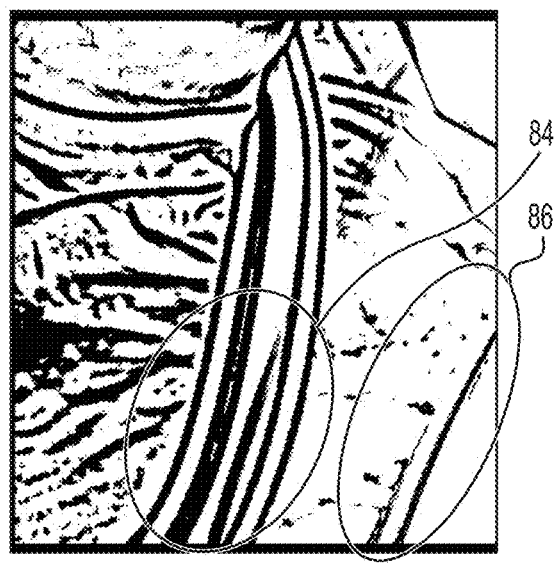
FIG. 12B shows a black-and-white image based on the image of FIG. 12A.

FIG. 12A shows an image of an occupant 44 wearing a seatbelt 50, with a shadow caused by an item in the vehicle, and with a boundary 70 of the shadow overlying the seatbelt 50. FIG. 12B shows a black-and-white image based on the image of FIG. 12A. FIG. 12B includes a third area 84 overlapping with the seatbelt 50 and including an additional dark stripe dark stripe on the black- and white image caused by the boundary 70 of the shadow. The dark stripe caused by the boundary of the shadow extends generally parallel to stripes in the seatbelt 50 and may adversely affect an ability of a machine vision system and method to detect the seatbelt 50. FIG. 12B also includes a fourth area 86 including additional stripes that correspond another boundary 70 of the shadow. Such additional stripes may result in a false detection or otherwise interfere with vision-based detection methods.

Figure 13:
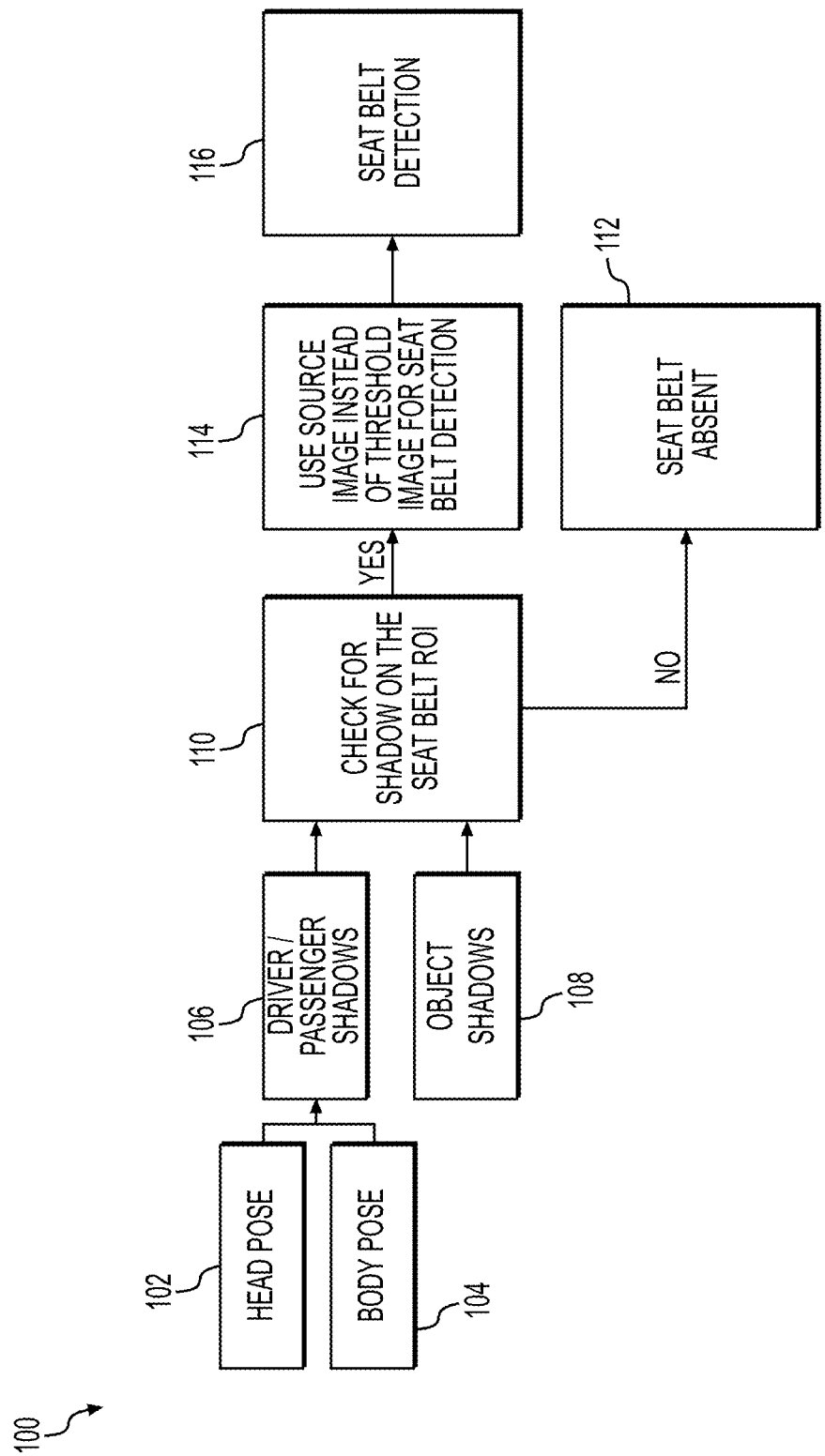
FIG. 13 shows a flowchart listing steps in a first method of detecting seatbelt positioning.

FIG. 13 shows a flowchart listing steps in a first method 100 of detecting seatbelt positioning. The first method 100 includes detecting shadows that may cause issues in image preprocessing by fusing the shadows caused by head and body pose of one or more occupants in a vehicle, such as a driver and/or one or more passengers along with shadows caused by in-vehicle items. If the fused shadow region is present in a potential seatbelt region (which may also be called a seatbelt region of interest), then regular preprocessing may be replaced with a different algorithm that directly uses a source image (instead of a corresponding black/white image) for seatbelt detection. In some embodiments, the first method 100 may be implemented only in cases where other vision-based detection methods, such as methods using the black-and-white image, are unsuccessful in detecting the seatbelt 50.

The first method 100 includes detecting a head pose of an occupant in the vehicle at step 102. Step 102 may be performed by the processor 30 using a source image captured by the camera 20. Step 102 may include recognizing the head of the occupant and determining a position of the occupant's head. The head pose may include a size, shape, and position of the occupant's head relative to one or more other structures, such as the camera 20, the seatbelt 50, a seat, etc.

The first method 100 also includes detecting a body pose of an occupant in the vehicle at step 104. Step 104 may be performed by the processor 30 using the source image captured by the camera 20. The body pose may include a size, shape, and position of one or more body parts of the occupant, such as a hand, forearm, chest, and/or one or more items of clothing on the occupant. The body pose may include a position of the body part relative to one or more other structures, such as the camera 20, the seatbelt 50, a seat, etc.

The first method 100 also includes determining an occupant shadow based on the head pose and/or the body pose at step 106. The occupant shadow may include a shadow that is expected to result from the body or the head of the occupant blocking light from one or more light sources, which may have known locations and light projection properties. The one or more light sources may include, for example, the near-infrared light source 26, which may be located in a center stack of the vehicle. However, the one or more light sources may be located in other places within the vehicle.

The first method 100 also includes determining an object shadow caused by an item in the vehicle at step 108. The object shadow may include a shadow resulting from a vehicle component, such as a steering wheel and/or a sun visor.

The first method 100 also includes checking for a shadow on the seatbelt region of interest (ROI) at step 110. Step 110 may include fusing the occupant shadow from step 106 with the object shadow from step 108. Step 110 may include determining if a boundary of a shadow, such as the fused shadow) overlies the ROI for the seatbelt.

The first method 100 also includes determining that the seatbelt is not present in the ROI at step 112 and in response to step 110 of the method determining that there is no shadow or no boundary of a shadow in the ROI.

The first method 100 also includes using the source image instead of a threshold image, such as the black-and-white image for detecting the seatbelt at step 114 and in response to step 110 of the first method 100 determining that there is a shadow and/or a boundary of a shadow in the ROI.

The first method 100 also includes detecting the seatbelt in the ROI at step 116 and using the source image as determined at step 114. Step 116 may be invoked only after step 114 and in response to step 110 of the first method 100 determining that there is a shadow and/or a boundary of a shadow in the ROI. Step 116 may include relatively computationally intensive processing, so it may be invoked only selectively, and where it is likely to be effective, such as where the shadow and/or the boundary of the shadow is known to exist in the ROI. Step 116 may include special processing steps based on knowing characteristics of the shadow and/or the boundary of the shadow, such as a location of the boundary, and whether the boundary corresponds to a transition from shadow to non-shadow or vice-versa for a given scan direction across the ROI in the source image.

Figure 14:
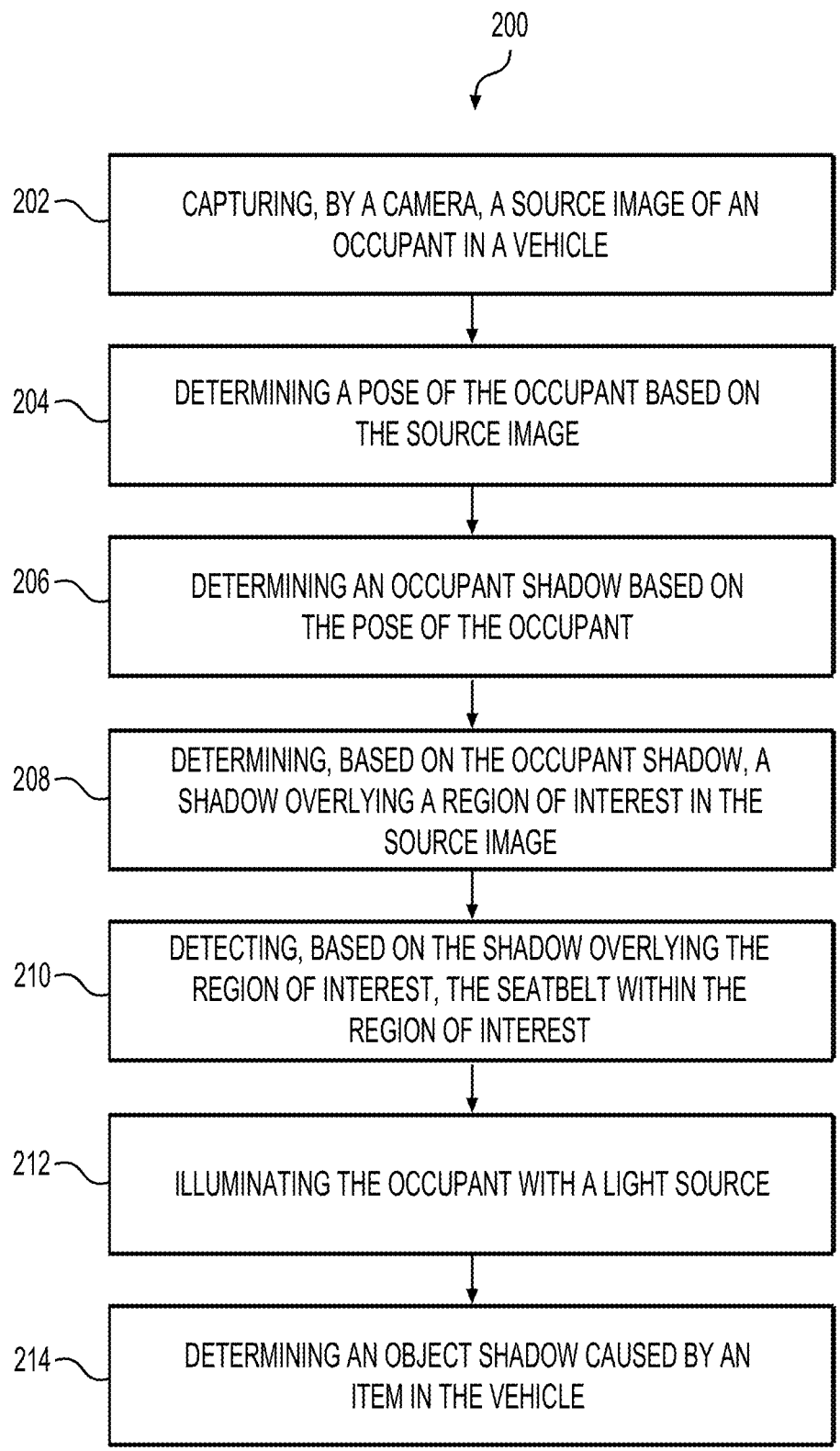
FIG. 14 shows a flowchart listing steps in a second method of detecting seatbelt positioning.

A second method 200 of detecting seatbelt positioning is shown in the flowchart of FIG. 14. The second method 200 includes capturing, by a camera, a source image of an occupant in a vehicle at step 202. Step 202 may include capturing the source image in the near infrared (NIR) spectrum, which may include detecting reflected NIR light provided by a near-infrared light source 26. Step 202 may further include transmitting the source image, as a video stream or as one or more still images, from the camera 20 to a control system 13 having a processor 30 for additional processing.

The second method 200 also includes determining a pose of the occupant based on the source image at step 204. The processor 30 may perform step 204, which may include determining a pose, such as a position and orientation of a head and/or one or more other body parts, such as a hand or forearm of the occupant.

The second method 200 also includes determining an occupant shadow based on the pose of the occupant at step 206. The processor 30 may perform step 206, which may include determining the occupant shadow based on properties of one or more light sources. The occupant shadow may include a shadow that is expected to result from the occupant blocking light from one or more light sources, which may have known locations and light projection properties. The one or more light sources may include, for example, the near-infrared light source 26, which may be located in a center stack of the vehicle. However, the one or more light sources may be located in other places within the vehicle and/or outside of the vehicle.

The second method 200 also includes determining, based on the occupant shadow, a shadow overlying a region of interest (ROI) in the source image at step 208. The processor 30 may perform step 208, which may include determining the occupant shadow and/or a boundary of the occupant shadow overlying the ROI in the source image. The region of interest may include a region where the seatbelt 50 is to be detected, such as an area across a torso of the occupant or an area over the shoulder of the occupant.

In some embodiments, step 208 further includes detecting an external shadow due to an external illumination source outside of the vehicle, such as a shadow resulting from an item or a body part blocking sunlight or other external illumination.

The second method 200 also includes detecting, based on the shadow overlying the region of interest, the seatbelt within the ROI at step 210. The processor 30 may perform step 210, which may include using one of two or more different detection algorithms for detecting the seatbelt in the region of interest based on the shadow overlying the region of interest. For example, a first detection algorithm may be used for detecting the seatbelt in the ROI in response to detecting no shadow and/or detecting no boundary of a shadow that overlies the ROI, and a second, different, detection algorithm may be used for detecting the seatbelt in the ROI in response to detecting a shadow and/or detecting a boundary of a shadow that overlies the ROI. The first detection algorithm may use a black-and-white image to detect the seatbelt, whereas the second detection algorithm may use the source image, which may include pixels each having one of a plurality of different brightness values. The second detection algorithm may be more computationally intensive and/or slower than the first detection algorithm. In some embodiments, the second detection algorithm may include using information regarding the shadow, such as a location and/or orientation of a boundary of the shadow, for detecting the seatbelt.

In some embodiments, the source image includes a plurality of pixels each having an associated brightness value having one of a range of different values. In some embodiments, step 210 includes using the source image to detect a plurality of transitions between bright segments and dark segments on the seatbelt based on the brightness values of the plurality of pixels and in response to determining, at step 208, the shadow overlying the ROI.

In some embodiments, step 210 includes converting the source image to a black-and-white image and scanning across the black-and-white image to detect a plurality of transitions between bright segments and dark segments on the seatbelt and in response to determining no shadow overlying the region of interest.

In some embodiments, the second method 200 may include illuminating the occupant with a light source at step 212. Step 206 may further include determining the occupant shadow is also based on a location of the light source.

In some embodiments, the second method 200 may include determining an object shadow caused by an item in the vehicle, such as a steering wheel or a visor, at step 214. Step 208 may further include determining the shadow overlying the ROI further based on the object shadow. For example, step 208 may indicate a shadow or a boundary of a shadow overlying the ROI in response to either or both of the occupant shadow and/or the object shadow overlying the ROI. In some embodiments, step 214 may include determining a fused shadow based on the occupant shadow and the object shadow, and step 211 may indicate the fused shadow or the boundary of the fused shadow overlying the ROI.

In some embodiments, and in particularly where the occupant is illuminated by the light source at step 212, determining the object shadow at step 214 is also based on a location of the light source.

In some embodiments, dedicated hardware implementations, such as application specific integrated circuits, programmable logic arrays, and other hardware devices, can be constructed to implement one or more steps of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Further, the methods described herein may be embodied in a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

As a person skilled in the art will readily appreciate, the above description is meant as an illustration of the principles of this invention. This description is not intended to limit the scope or application of this invention in that the invention is susceptible to modification, variation, and change, without departing from the spirit of this invention, as defined in the following claims.

What is claimed is:

1. A method for detecting a position of a seatbelt in a vehicle, comprising:
    capturing, by a camera, a source image of an occupant in the vehicle, wherein the source image includes a plurality of pixels each having an associated brightness value having one of a range of different values;
    executing, by a processor in communication with the camera, instructions to cause the processor to:
        determine a pose of the occupant based on the source image;
        determine an occupant shadow based on the pose of the occupant;
        determine, based on the occupant shadow, whether a shadow overlies a region of interest in the source image; and
        detect the seatbelt within the region of interest, wherein detecting the seatbelt within the region of interest includes at least one of:
            using the source image to detect a plurality of transitions between bright segments and dark segments on the seatbelt based on the brightness values of the plurality of pixels and in response to determining the shadow overlying the region of interest, or
            converting the source image to a black-and-white image and scanning across the black-and-white image to detect a plurality of transitions between bright segments and dark segments on the seatbelt and in response to determining the shadow not overlying the region of interest.

2. The method of claim 1, wherein detecting the seatbelt within the region of interest includes using the source image to detect a plurality of transitions between bright segments and dark segments on the seatbelt based on the brightness values of the plurality of pixels and in response to determining the shadow overlying the region of interest.

3. The method of claim 1, wherein the method includes converting the source image to a black-and-white image, and
    wherein detecting the seatbelt within the region of interest includes scanning across the black-and-white image to detect a plurality of transitions between bright segments and dark segments on the seatbelt and in response to determining the shadow not overlying the region of interest.

4. The method of claim 1, wherein capturing the image of the occupant includes capturing the image in near infrared (NIR).

5. The method of claim 1, further comprising illuminating the occupant with a light source, and wherein determining the occupant shadow is also based on a location of the light source.

6. The method of claim 1, further comprising determining an object shadow caused by an item in the vehicle; and
    wherein determining the shadow overlying the region of interest is further based on the object shadow.

7. The method of claim 6, further comprising fusing the occupant shadow with the object shadow to determine a fused shadow; and
    wherein determining the shadow overlying the region of interest is based on the fused shadow.

8. The method of claim 6, further comprising illuminating the occupant with a light source, and wherein determining the object shadow is also based on a location of the light source.

9. The method of claim 1, wherein determining the shadow overlying the region of interest in the source image further comprises detecting an external shadow due to an external illumination source outside of the vehicle.

10. The method of claim 1, wherein the shadow overlying the region of interest includes a boundary of the shadow overlying the region of interest.

11. A system for detecting a position of a seatbelt in a vehicle, comprising:
    a camera configured to capture a source image of an occupant in the vehicle, wherein the source image includes a plurality of pixels each having an associated brightness value having one of a range of different values; and
    a controller in communication with the camera and including a processor in communication with a memory containing instructions that, when executed by the processor, cause the controller to:

determine a pose of the occupant based on the source image;

determine an occupant shadow based on the pose of the occupant;

determine, based on the occupant shadow, whether a shadow overlies a region of interest in the source image;

detect the seatbelt within the region of interest, wherein detecting the seatbelt within the region of interest includes at least one of:

the controller using the source image to detect a plurality of transitions between bright segments and dark segments on the seatbelt based on the brightness values of the plurality of pixels and in response to determining the shadow overlying the region of interest, or the controller converting the source image to a black-and-white image and scanning across the black-and-white image to detect a plurality of transitions between bright segments and dark segments on the seatbelt and in response to determining the shadow not overlying the region of interest.

12. The system of claim 11, wherein detecting the seatbelt within the region of interest includes the controller using the source image to detect a plurality of transitions between bright segments and dark segments on the seatbelt based on the brightness values of the plurality of pixels and in response to determining the shadow overlying the region of interest.

13. The system of claim 11, further comprising the controller being configured to convert the source image to a black-and-white image; and wherein detecting the seatbelt within the region of interest includes the controller scanning across the black-and-white image to detect a plurality of transitions between bright segments and dark segments on the seatbelt and in response to determining the shadow not overlying the region of interest.

14. The system of claim 11, wherein capturing the image of the occupant includes the camera capturing the image in near infrared (NIR).

15. The system of claim 11, further comprising a light source configured to illuminate the occupant, and wherein determining the occupant shadow is also based on a location of the light source.

16. The system of claim 11, further comprising determining an object shadow caused by an item in the vehicle; and wherein determining the shadow overlying the region of interest is further based on the object shadow.

17. The system of claim 16, further comprising fusing the occupant shadow with the object shadow to determine a fused shadow; and wherein determining the shadow overlying the region of interest is based on the fused shadow.

18. The system of claim 16, further comprising a light source configured to illuminate the occupant, and wherein determining the object shadow is also based on a location of the light source.

19. The system of claim 11, wherein determining the shadow overlying the region of interest in the source image further comprises the controller detecting an external shadow due to an external illumination source outside of the vehicle.

20. The system of claim 11, wherein the shadow overlying the region of interest includes a boundary of the shadow overlying the region of interest.

* * * * *